(No Model.)

T. E. OGRAM.
APOTHECARY'S GRADUATE.

No. 524,766. Patented Aug. 21, 1894.

Witnesses,
Sidney P. Hollingsworth
John Still

Inventor,
Thomas Edwin Ogram

UNITED STATES PATENT OFFICE.

THOMAS EDWIN OGRAM, OF WASHINGTON, DISTRICT OF COLUMBIA.

APOTHECARY'S GRADUATE.

SPECIFICATION forming part of Letters Patent No. 524,766, dated August 21, 1894.

Application filed August 10, 1893. Serial No. 482,804. (No model.)

*To all whom it may concern:*

Be it known that I, THOMAS EDWIN OGRAM, a citizen of the United States, residing at Washington, in the District of Columbia, have invented certain new and useful Improvements in Graduates Employed by Apothecaries, of which the following is a specification.

My invention relates to "graduates" used by apothecaries and druggists, and the object of the same is to produce a graduate that is not liable to breakage, as is the case with the glass graduate now in universal use.

The graduates now used being made of glass are easily broken, and being expensive, it is an item of much outlay to druggists to supply new ones in lieu of those so frequently broken. I overcome this objection to the old graduate by producing a graduate from gutta-percha or other like substance that will not break and that will resist acids: and at the same time I provide means whereby the amount of liquid within the graduate can be instantly seen upon the scale.

The necessity of readily seeing the quantity of liquid in the graduate has been the cause that has necessitated glass as the material from which to construct them up to the present time.

I so construct my graduate as to retain the advantage of the transparent property of the glass, but at the same time I produce a practically indestructible graduate, so far as fragibility is concerned.

My invention therefore consists broadly in a graduate formed of a non brittle substance, and provision whereby the rays of light can pass entirely through the graduate, and thereby permit free vision of the contents.

The materials from which my graduate must be constructed being opaque renders it necessary to provide means whereby light and vision can pass entirely through it.

I will now describe my invention with reference to the accompanying drawings, in which—

Figure 1:
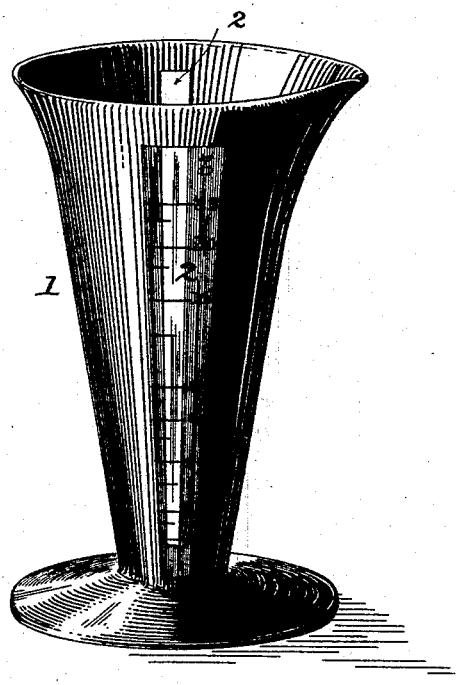
Figure 2:
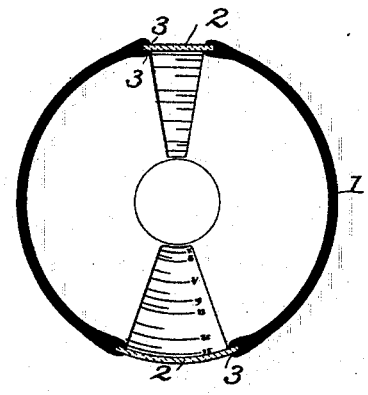
Figure 3:
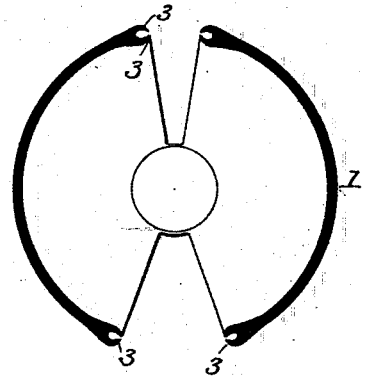

Figure 1 is a perspective view of my graduate. Fig. 2 is a cross section through the graduate; Fig. 3 a cross section with the transparent portions removed.

In the several figures like parts are represented by like numerals.

The numeral 1 represents the body portion of the device, and which is formed of some non brittle material such for instance as gutta-percha. To provide transparent portions through which to see the contents of the vessel, I provide openings in the body thereof, and secure therein transparent graduated scales such as are represented in Figs. 1 and 2 by the numeral 2. The function of the parts 2 is two-fold; first they afford means for the passage of light entirely through the graduate from side to side whereby the amount of liquid therein can at once be seen; and they also provide a scale whereby to regulate the amount of contents. These transparent portions should be opposite each other. I have shown two, but more might be employed if desired, but I deem two sufficient. Of course the size or area of the transparent parts 2, can be varied in proportion to the size of the graduate.

To secure the parts 2 in position I provide grooves in the margins of cut-away portions of the body 1, and insert them therein: the grooves may be made such a snug fit as to require no other means for making a tight joint; but if desirable the jaws 3 of the grooves might be compressed upon the parts 2, thus attaining the same result. A suitable cement may be employed when found necessary.

In Fig. 3 I have shown the arms 3 of the slotted edges in the nature of spring arms, being nearer together at their free ends than the thickness of the transparent parts 2, whereby said arms will tightly embrace and hold the parts 2 through their resilience.

I provide the front and rear transparent parts 2 with corresponding scales whereby the contents of the vessel can readily be seen and regulated.

It is immaterial of course whether the transparent parts 2, are of the same size or not; the main thing in this particular being that said transparent parts 2 are on opposite portions of the vessel so that light and vision can pass unobstructed clear through from side to side.

I desire to distinctly state that I do not confine my invention to any particular material; I consider gutta-percha preferable in view of its acid resisting qualities, and also in view of the facility with which it can be manipulated in the manufacture of the graduate; but it is very evident that sheet metal coated with some vitreous enamel or solution could be employed with good effect. Nor do I limit myself to the employment of glass as the only material from which to construct the graduated scales and transparent portions of my graduate, for mica can well be employed for such purpose.

What I claim as my invention, and desire to secure by Letters Patent, is—

1. A graduate the fluid receiving portion of which is formed of a non fragile and acid resisting material, and having transparent portions whereby light is transmitted entirely through the same substantially as specified.

2. A graduate the fluid receiving portion of which is formed of a non fragile and acid resisting material, and having graduated or scaled transparent portions whereby light is transmitted entirely through the same substantially as specified.

3. A graduate, the fluid receiving portion of which is formed of a non fragile and acid resisting material and having transparent portions secured in grooves or ways formed integral with the body of the graduate whereby light is transmitted through said graduate, substantially as specified.

4. A graduate the fluid receiving portion of which is formed of gutta percha or equivalent non brittle material, and having transparent portions secured therein through the resilience of slotted portions of the body of the graduate.

THOMAS EDWIN OGRAM.

Witnesses:
JOHN STILLÉ,
MARGARET STILLÉ.